No. 791,777.

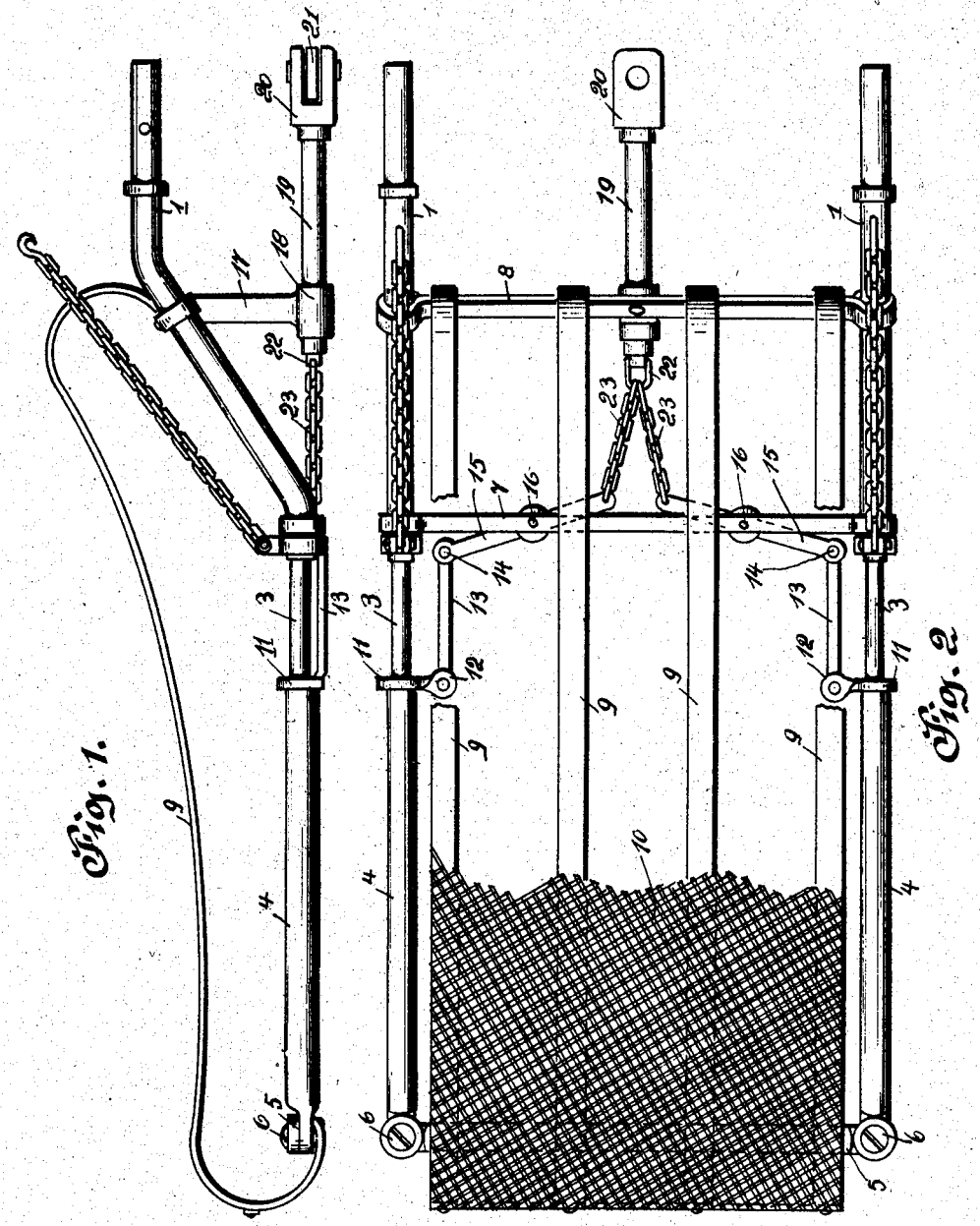

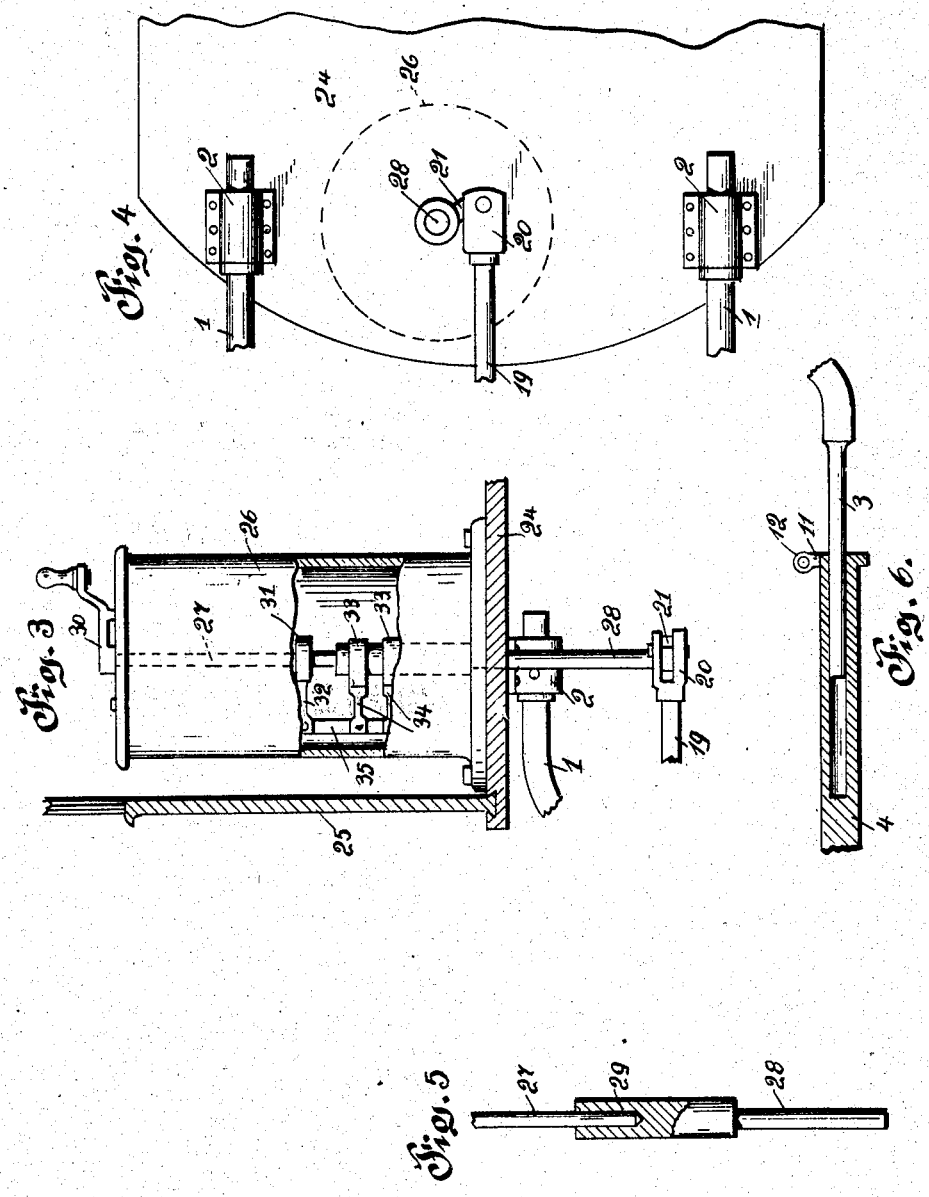

Patented June 6, 1905.

UNITED STATES PATENT OFFICE.

JOSEPH HASTREITER AND CLEMENS DILLHOFF, OF MORGANTOWN, WEST VIRGINIA.

CAR-FENDER.

SPECIFICATION forming part of Letters Patent No. 791,777, dated June 6, 1905.

Application filed March 18, 1905. Serial No. 250,762.

*To all whom it may concern:*

Be it known that we, JOSEPH HASTREITER and CLEMENS DILLHOFF, subjects of the Emperor of Germany, residing at Morgantown, in the county of Monongalia and State of West Virginia, have invented certain new and useful Improvements in Car-Fenders, of which the following is a specification, reference being had therein to the accompanying drawings.

This invention has relation to car-fenders; and the invention has for its object to provide a car-fender of novel form which is so connected with the current-controlling devices of an electric car that when the fender strikes a person or other object the current will be cut off from the car, so that the car will come to a stop.

The invention has for its further object the provision of novel means for preventing injury to a person or other object that may be struck by the fender; and still further objects of the invention will be developed during the description of the mechanism which we employ.

The invention, briefly described, consists in the provision of a car-fender so constructed and arranged and connected with the current-controlling devices of an electric car that when an object is struck by the fender the impact of the blow or the weight of the object falling on the fender will operate such controlling mechanism to cut off the current from the car, so as to cause the car to stop.

In the accompanying drawings, illustrating our invention, Figure 1 is a side elevation of our improved fender detached from a car. Fig. 2 is a top plan view of the same. Fig. 3 is a fragmentary view, partly in section, of the front platform of a car, showing a controller mounted thereon and showing the connections therewith of our improved fender. Fig. 4 is a fragmentary view of the bottom of the platform of a car, showing the connection between the shaft of the controller mounted thereon and the movable bar of the fender and the connection between the platform and the stationary side rails of the fender. Fig. 5 is a fragmentary view, partly in section, of the controller-shaft; and Fig. 6 is a fragmentary view, partly in section, of one of the side rails of the fender.

In the several figures of the drawings like numerals of reference designate corresponding parts, and we will refer first to Figs. 1 and 2, in which the fender is shown detached from the car. The fender is supported by stationary side rails 1 1, which fit into brackets 2 2 on the bottom of the car-platform. These side rails 1 1 extend horizontally for a short distance beyond the front edge of the platform and then descend at an angle and again extend forwardly in a horizontal line, the lower extension being reduced in diameter, as designated at 3. The lower extensions 3 3 of the side rails telescope into the hollow sections 4 4, and these hollow sections are connected together at their front ends by a cross-bar 5, the cross-bar and the parts 4 4 being formed with coinciding eyes through which are passed screw-bolts 6 6. The stationary portions 1 1 of the side rails of the fender are provided with cross-braces 7 and 8, these cross-braces being formed with eyes on their ends, through which the side rails 1 1 pass. Curved spring-bars 9 are attached to the bottom of the cross-bar 5 and are also attached to the cross-brace 8, these bars curving outwardly from above the cross-bar 5 and the cross-brace 8, so as to prevent any possible contact with said cross-bars of a person or object striking against or falling upon the fender. In order to prevent the possibility of a person or object falling through the fender upon the bars 9, we cover these bars with a netting 10, which may be of any suitable character, such as netted or interwoven cords. Upon the inner ends of the sections 4 4 are secured links 11 11, which have laterally-extending eyes 12, to which are pivotally secured links 13, that extend parallel to the diminished portions 3 of the side rails 1, and the opposite ends of these links 13 are pivotally connected at 14 to rocking levers 15, which are pivotally connected at 16 to the cross-bar 7. The cross-brace 8 carries a hanger 17, which has a sleeve 18 at its lower end, and in this sleeve slides a rod 19, which carries a bifurcated head 20 on its end, and between the legs of this head is pivotally secured a crank 21, this crank being, as will be presently described, attached to the shaft of the controller on the platform of the car. The end of the rod 19 opposite to the end which carries the head 20 is provided with a stirrup 22, to which are connected two chains 23 23, that have their opposite ends attached to the rocking levers 15 15, respectively.

Referring now to Figs. 3, 4, 5, and 6 of the drawings, in which the bottom of the platform of the car is designated 24 and the dashboard 25, it will be observed that the rod 19 projects under the platform of the car adjacent to the lower end of the shaft of a controller 26, mounted on the platform. This controller is of the ordinary construction, except in so far as the construction of the vertical shaft is concerned, which shaft is shown in detail in Fig. 5 of the drawings and is composed of two alining sections 27 and 28, the section 28 being enlarged at its upper end and said upper end being provided with a round socket 29, in which the upper section 27 of the rod rests and turns. It will be observed by reference to Figs. 3 and 4 that the crank 21 is attached to the lower end of the section 28 of the controller-shaft, so that if the rod 19 is reciprocated the controller-shaft will be given a partial revolution. The upper section 27 of the controller-shaft is provided with a usual operating-handle 30, and this upper section of the shaft carries rotary contact-sections 31 31, that are adapted to make circuit through stationary contacts 32 32, while the lower section 28 of the controller-shaft carries rotary contact-sections 33 33, that are adapted to make circuit with stationary contacts 34 34, the stationary contacts 34 and 32 being carried by a frame 35, arranged within the controller-casing.

The device constructed in the above-described manner operates as follows: Under ordinary circumstances the fender stands in the position shown in Figs. 1 and 2, the front or movable portion of the fender being sustained in extended position by the resiliency of the bars 9 9. The circuits through the car, it is to be understood, pass in series through the several contacts 31, 32, 33, and 34, the rotary contacts 33 33 being in this position of parts in contact with the stationary contacts 34 34 and the rotary contacts 31 31 being under control of the motorman and in or out of contact, accordingly as current is thrown on or off. If now a person or object is struck by and falls upon the fender, the bars 9 9 will bend, thus reducing the distance between their points of attachment to the fender, and in consequence thereof the movable portions 4 of the side rails will be pushed inwardly, sliding on the reduced portions 3 of the side rails 1. This movement of the parts 4 4 will rock the levers 15, and traction will be imposed upon the rod 19 through the medium of the chains 23 23, and the rod 19 being drawn toward the fender will, through the medium of the crank 21, partially rotate the controller-shaft and will throw the rotary contacts 33 33 into such position that they will break circuit with the stationary contacts 34 34 and cut off the current to the motor, whereupon the car will stop, the brakes of course being applied in the usual manner.

What we claim, and desire to secure by Letters Patent, is—

1. The combination with an electric car and a controller mounted thereon and provided with a sectional shaft, each section of said shaft carrying contact members arranged in series in the car-circuit, of a fender comprising stationary side rails, movable side rails telescoping each of said stationary side rails, rocking levers connected to said movable side rails, a sliding rod carried by the fender, and a link connecting said sliding rod to the lower section of the controller-shaft.

2. The combination with an electric car, a controller carried by said car, a shaft mounted in said controller, said shaft being composed of independent movable sections, a handle carried by one of said sections, a fender mounted on the car and comprising a stationary portion and a movable portion, and connections between the movable portion of the fender and one of the sections of the controller-shaft, each section of the controller-shaft being provided with contacts interposed in the car-circuit.

3. The combination with an electric car, of a fender comprising stationary and movable portions, a controller-casing mounted on the car and provided with stationary contacts, a controller-shaft mounted in said casing and composed of independently-revoluble sections, movable contact members carried by each section, a handle carried by one section, and a connection between the other section of said shaft and the movable portion of the fender.

In testimony whereof we affix our signatures in the presence of two witnesses.

JOSEPH HASTREITER.
CLEMENS DILLHOFF.

Witnesses:
E. G. DONLEY,
JOHN L. HATFIELD.